United States Patent
Fong et al.

[11] Patent Number: 5,997,291
[45] Date of Patent: Dec. 7, 1999

[54] HOT-MELT MATERIAL FOR HEATING PLATE

[75] Inventors: Jon Jody Fong, Calabasas; John Stockwell, Sylmar, both of Calif.

[73] Assignee: 3D Systems, Inc., Valencia, Calif.

[21] Appl. No.: 09/258,023

[22] Filed: Feb. 25, 1999

[51] Int. Cl.⁶ .................................................... C22B 7/04

[52] U.S. Cl. .......................................... 432/161; 266/242

[58] Field of Search ..................... 432/74, 161; 165/110; 392/435; 266/242, 903; 126/343.5, 390; 219/421, 426

[56] References Cited

U.S. PATENT DOCUMENTS

| | | | |
|---|---|---|---|
| 4,955,361 | 9/1990 | Sotani et al. | 126/390 |
| 4,990,747 | 2/1991 | Konda | 392/435 |
| 5,362,033 | 11/1994 | Sakurai et al. | 266/242 |
| 5,532,458 | 7/1996 | Kratel et al. | 219/464 |

*Primary Examiner*—Mark Paschall
*Assistant Examiner*—Gregory A. Wilson
*Attorney, Agent, or Firm*—A. Sidney Alpert

[57] ABSTRACT

A heating element assembly for use in a rapid prototype modeling machine is described. The heating element of the hot melt assembly and an associated product container deliver hot melt product to the jets of the rapid prototype modeling machine.

10 Claims, 3 Drawing Sheets

HOT-MELT MATERIAL FOR HEATING PLATE

BACKGROUND OF THE INVENTION

1. Description of the Art Practices

It is known that materials may be melted and re-solidified in order to form solid objects, such as in the field of rapid prototype modeling. The present invention deals with rapid prototype modeling and, in particular, with an efficient manner for melting materials.

2. Background of the Invention

It is known in rapid prototype modeling that the hot-melt material suffers from the difficulty of uneven melting. The hot-melt product must melt in sufficient time to be utilized with a jet for application of the hot-melt material to a substrate. The heating of the hot-melt product should be accomplished at as low an energy cost as possible.

It is desirable to use a solid slug of a hot-melt material in a rapid prototype-modeling machine. However, the use of a solid slug is difficult if the solid slug melts unevenly in the heating mechanism.

The present invention is directed to the use of slugs of a hot-melt material, and in particular a slug from a container which may remain in place during melting of the slug. The hot-melt heating element assembly of the present invention is uniquely adapted to the use of maintaining a container in place as the slug of material is melted.

SUMMARY OF THE INVENTION

The present invention describes a hot-melt heating element assembly comprising a base, a first upper surface of said base, a second upper surface of said base, said second upper surface recessed from the plane of said first upper surface, at least one channel in said base, said channel recessed from the plane of said second upper surface and substantially surrounding said second upper surface, for when a hot melt product is melted on said second upper surface to receive the melted product, at least one dam located in said channel, for when a hot melt product is melted to direct the flow of melted product in said channel, at least one reservoir in said base communicating with at least one said channel, for when a melted product is present in said channel to collect the melted hot melt product, at least one surface means in said base defining at least one product conduit, said product conduit communicating with said reservoir to receive the melted product, a first lower surface of said base, a second lower surface of said base recessed from said first lower surface of said base, said second lower surface communicating with at least said one product conduit, for when melted product flows through said product conduit to distribute the melted product, and at least one surface means in said base defining at least one heating element conduit, to receive a heating element.

BRIEF DESCRIPTION OF THE DRAWINGS

Further features of the present invention will become apparent to those skilled in the art to which the present invention relates from the following specification with reference to the accompanying drawings, in which.

DETAILED DESCRIPTION OF THE INVENTION

Figure 1:
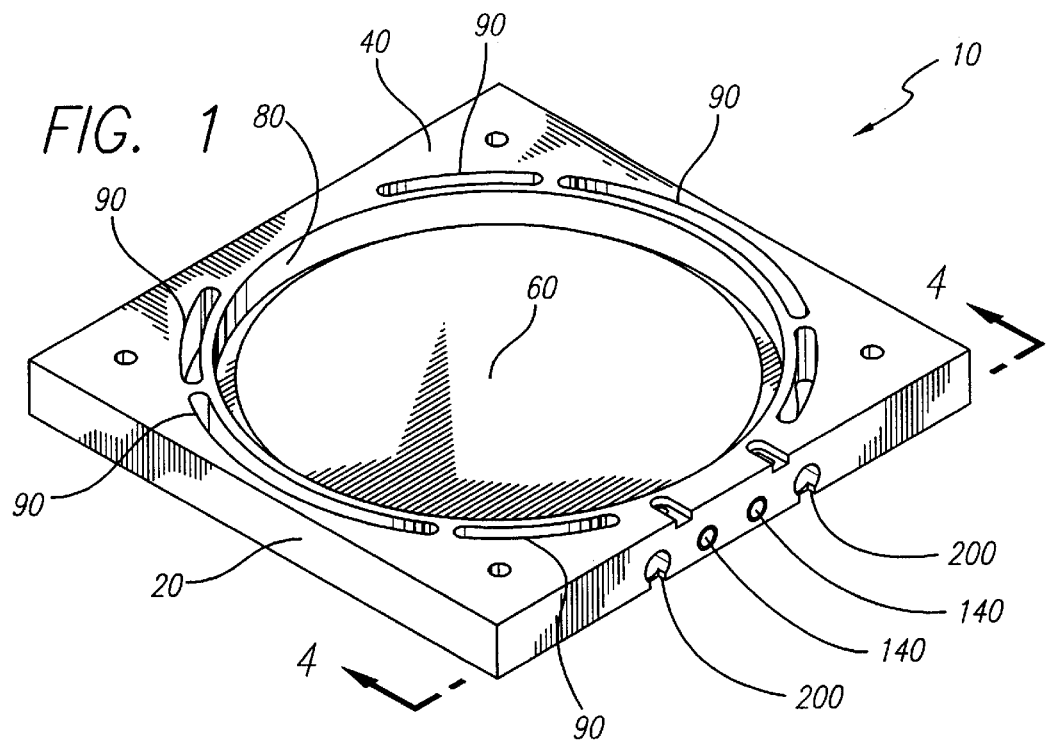
FIG. 1 is a perspective view of the hot-melt heating element assembly.

A hot-melt heating element assembly 10 is shown in FIG. 1. The hot-melt heating element assembly 10 is comprised of a base 20 having first upper surface 40. The first upper surface 40 of the base 20 is generally planar.

A second upper surface 60 of the base 20 is recessed from and surrounded by the upper first surface 40. The second upper surface 60 is generally planar.

At least one gutter 80 in the base 20 is recessed from the plane of the second upper surface 60. The gutter 80 substantially surrounds the second upper surface 60. A dam 100 is located in the gutter 80. A series of arc shaped channels 90 extend through the base 20. The arc shaped channels are radially outward of the gutter 80.

A first reservoir 120 is located in the base 20. The first reservoir is separated from the gutter 80 by the dam 100. A second reservoir 122 is recessed within the gutter 80. A surface means 140 defines a product conduit 144 in the base 20.

Figure 2:
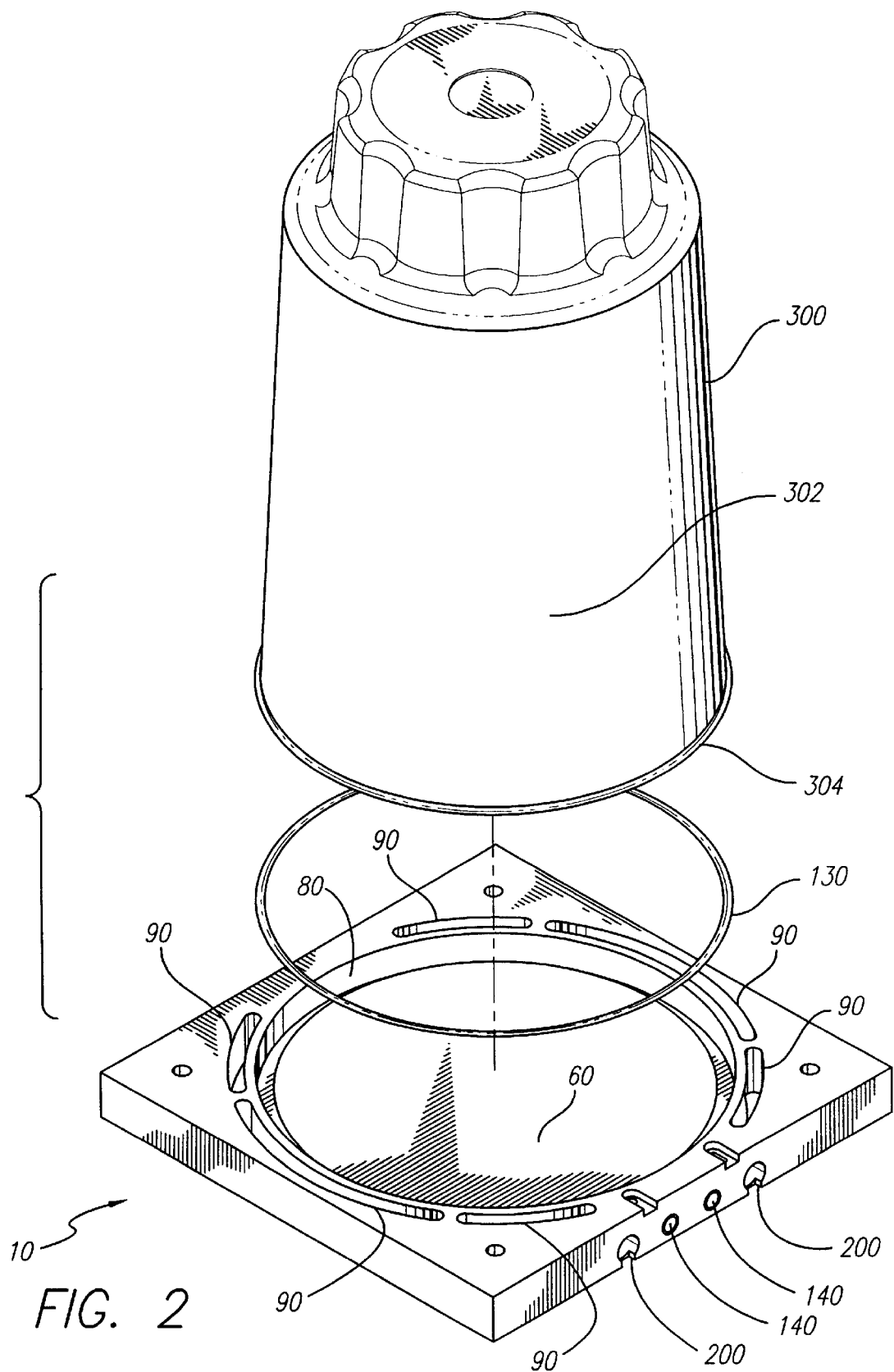
FIG. 2 is a perspective of the hot-melt heating element assembly and an associated container.
Figure 4:
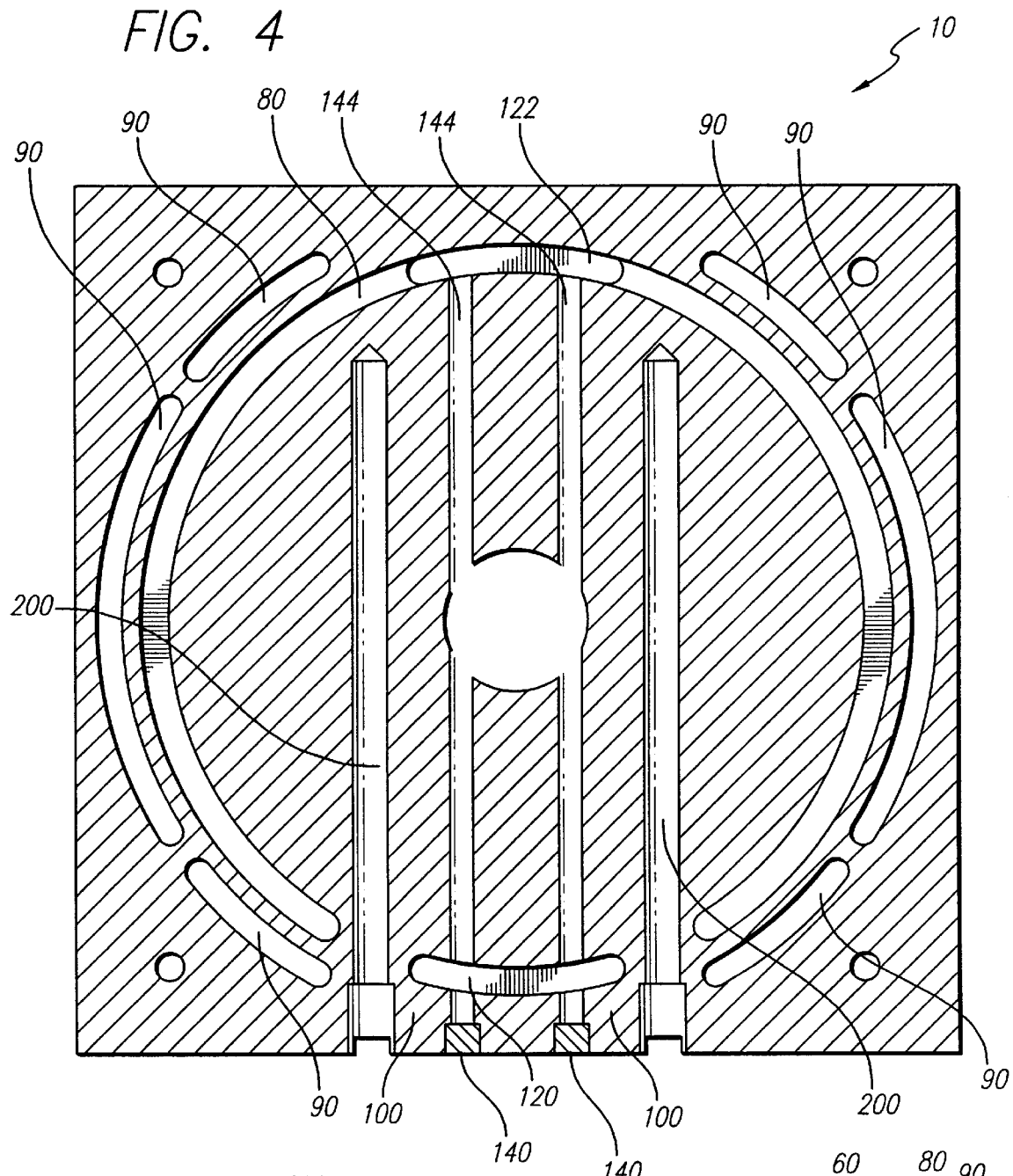
FIG. 4 is a sectional view of the hot-melt heating element assembly taken along lines 4—4 of FIG. 1.

As best seen in FIG. 2, a gasket 130 lies on and is mounted to the upper surface 40 of the base 20. The gasket 130 is positioned between the radially outward boundary of the gutter 80 and the arc shaped channels 90.

Figure 3:
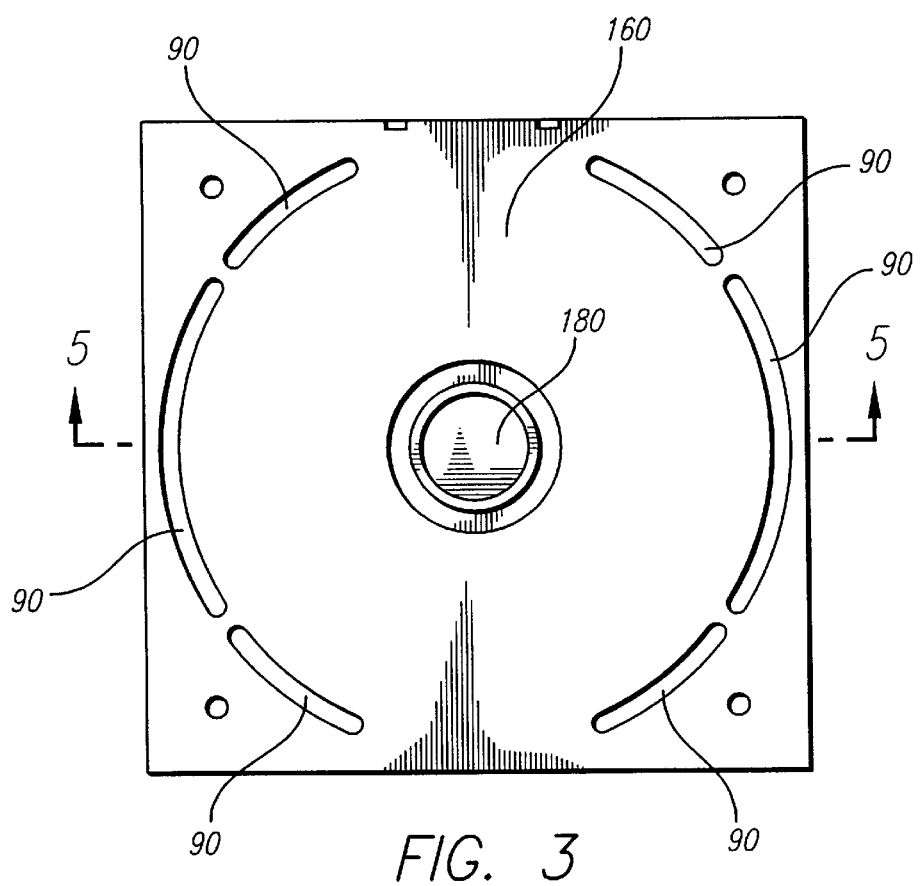
FIG. 3 is a bottom-plan view of the hot-melt heating, element assembly.

As best seen in FIG. 3, the base 20 of the hot-melt heating element assembly 10 has a first lower surface 160. The first lower surface 160 of the base 20 is generally planar. A second lower surface 180 is located toward the center of the base 20. The second lower surface 180 communicates with at least one product conduit 144.

Figure 5:
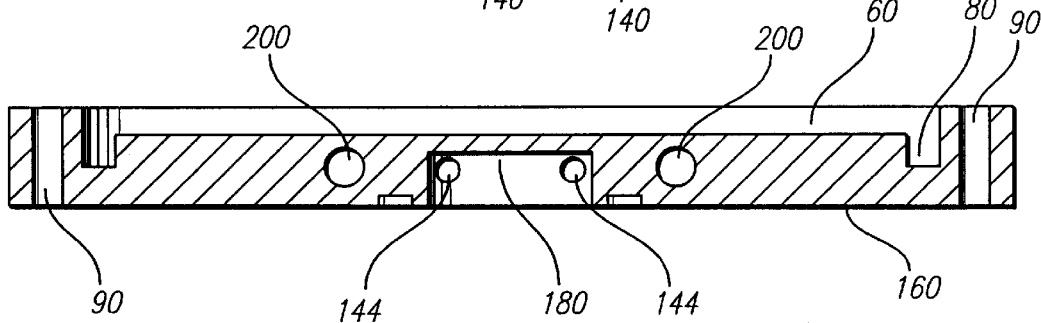
FIG. 5 is a sectional view of the hot-melt heating element assembly taken along lines 5—5 of FIG. 3.

The second lower surface 180 of the base 20 is recessed from the first lower surface 160. As seen in FIG. 5, a conduit 200 is located in the base 20. The conduit 200 in the base 20 defines an area for the positioning of at least one heating element (not shown). The heating element conduits 200 and the heating elements, when present, conveniently pass through the reservoir 80 in the base 20. The two heating elements are conveniently located outward and bracket the product conduits 144.

In operation, the invention is seen best in FIG. 2. A container 300 is filled with a slug of hot-melt ink. The slug of hot-melt ink in the container 300 is gently loosened by pressure on the outer wall 302 of the container 300. The lip 304 of the container 300 with the slug of hot-melt ink therein is positioned on the gasket 130. The slug of hot melt ink is permitted to fall from the container 300. The slug of hot-melt ink then lies on the second upper surface 60.

The container 300 retains the slug of hot-melt ink in place on the second upper surface 60. A pair of heating elements (not shown) are pressure fitted to the respective heating element conduits 200 and provide heat to melt the slug of hot melt. As the slug of hot-melt ink is melted on the second upper surface 60 of the base 20, the product spreads more or less evenly across the second upper surface 60. The melted product migrates across the second upper surface 60 and collects in the reservoirs 120 and 122.

The hot-melt product is more or less prevented from flowing directly to the reservoir 120 by a pair of dams 100 located in the gutter 80. The melted hot-melt product collects in the reservoirs 120 and 122 and thereafter flows into the product conduits 144 through an opening 140. The product conduits 144 are slightly angled to promote gravitational flow of the melted hot-melt product from the reservoirs 120 and 122 to the second lower surface 180 of the base 20. In the foregoing manner, the product collects and runs down sides of the second lower surface 180 instead of spreading out along the first lower surface 160 of the base 20. Thereafter, the melted hot-melt product flows to a second reservoir (not shown) for distribution to the rapid prototype-modeling machine.

In the foregoing manner, small particles of product must be heated and traverse the second upper surface 60 of the base 20 rather than being present as a particle which could block the product conduits 144 at the lower end of the reservoir. The heating elements which heat the reservoir 120 aid in preventing large chunks of hot melt product from blocking the opening 140.

The channels 90 prevent excess heat build up in the rapid prototyping machine by venting excess heat upward. The excess heat vented upward flows around the outer surface 302 of the container 300. As heat surrounds the outer surface 302 of the container 300, the hot melt product in the container 300 absorbs additional thermal energy to aid in melting the product.

What is claimed is:

1. A hot melt heating element assembly comprising:

a base, a first upper surface of said base, a second upper surface of said base, said second upper surface recessed from the plane of said first upper surface, at least one channel in said base, said channel recessed from the plane of said second upper surface and substantially surrounding said second upper surface, for when a hot melt product is melted on said second upper surface to receive the melted product, at least one dam located in said channel, for when a hot melt product is melted to direct the flow of melted product in said channel, at least one reservoir in said base communicating with at least one said channel, for when a melted product is present in said channel to collect the melted hot melt product, at least one surface means in said base defining at least one product conduit, said product conduit communicating with said reservoir to receive the melted product, a first lower surface of said base, a second lower surface of said base recessed from said first lower surface of said base, said second lower surface communicating with at least said one product conduit, for when melted product flows through said product conduit to distribute the melted product, and at least one surface means in said base defining at least one heating element conduit, to receive a heating element.

2. The hot melt heating element assembly according to claim 1, wherein the dam is located at one terminus of the channel.

3. The hot melt heating element assembly according to claim 1, wherein at least one said channel is sloped in said base to promote gravitational flow of hot product in said channel to said reservoir.

4. The hot melt heating element assembly according to claim 1, wherein there are at least two of said product conduits in said base.

5. The hot melt heating element assembly according to claim 1, wherein there are at least two heating element conduits in said base.

6. The hot melt heating element assembly according to claim 5, wherein said heating element conduits in said base are generally parallel.

7. The hot melt heating element assembly according to claim 4, wherein said product conduits in said base are generally parallel.

8. The hot melt heating element assembly according to claim 1, where there are at least two of said reservoirs.

9. The hot melt heating element assembly according to claim 1, wherein said second upper surface of said base at least partially defines a receiving channel, for when a hot melt product container is utilized, to receive the hot melt product container.

10. The hot melt heating element assembly according to claim 9, wherein at least one said reservoir is isolated from said second upper surface of said base, when said receiving channel receives the hot melt product container.

\* \* \* \* \*